(12) United States Patent
Sweeney

(10) Patent No.: US 10,830,899 B2
(45) Date of Patent: Nov. 10, 2020

(54) VISUAL DISPLAY SYSTEM FOR USE IN TESTING OR MONITORING A GPS ENABLED DEVICE

(71) Applicant: BAE Systems Information and Electronic Systems Integration Inc., Nashua, NH (US)

(72) Inventor: Patrick S. Sweeney, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 198 days.

(21) Appl. No.: 16/142,917

(22) Filed: Sep. 26, 2018

(65) Prior Publication Data

US 2020/0096646 A1    Mar. 26, 2020

(51) Int. Cl.
    *G01S 19/23*    (2010.01)

(52) U.S. Cl.
    CPC .................... *G01S 19/23* (2013.01)

(58) Field of Classification Search
    CPC ........ G01S 19/23; G01S 19/29; G01S 19/235; G01S 19/258; G01S 19/256
    USPC .................................................... 342/357.62
    See application file for complete search history.

(56) References Cited

U.S. PATENT DOCUMENTS

| | | | | |
|---|---|---|---|---|
| 6,563,636 B1* | 5/2003 | Baun | ...................... | G02B 23/16 318/266 |
| 6,808,144 B1* | 10/2004 | Nicolai | ................. | B64C 39/024 244/139 |
| 7,970,532 B2* | 6/2011 | Tehan | .................. | G05D 1/0646 701/23 |
| 8,359,178 B2* | 1/2013 | Rowe | ....................... | G01D 1/00 702/104 |
| 9,862,489 B1* | 1/2018 | Weinstein | ............. | B64C 39/024 |
| 10,291,316 B1* | 5/2019 | Schloemer | ............. | G01S 19/14 |
| 10,418,694 B2* | 9/2019 | Peitzer | ..................... | H01Q 1/18 |
| 2007/0069083 A1* | 3/2007 | Shams | ................... | G05D 1/101 244/195 |
| 2015/0346722 A1* | 12/2015 | Herz | .................... | G05D 1/0027 701/2 |
| 2016/0349058 A1* | 12/2016 | Yu | ............................ | B64G 1/24 |
| 2017/0371352 A1* | 12/2017 | Mari Mari | ............. | B64C 29/02 |

(Continued)

*Primary Examiner* — Harry K Liu
(74) *Attorney, Agent, or Firm* — Sand, Sebolt & Wernow LPA; Scott J. Asmus

(57) ABSTRACT

An indicator assembly and method for detecting and indicating a Global Positioning System (GPS) signal error during testing or monitoring of a GPS enabled device. The assembly includes an azimuth-elevation servo system; a GPS receiver; and a microprocessor engaged with the GPS receiver and servo system. The microprocessor executes programming that compares an expected self-position solution of the indicator assembly with a reported-position solution of the indicator assembly provided by the GPS receiver. The microprocessor activates the servo system to move a visually-observable indicator device to a position that reflects results of the comparison between the expected and reported position solutions. An operator noting unexpected behavior in the GPS enabled device checks the position of the indicator device and determines that a GPS signal error has occurred when the indicator device is oriented at any angle other than ninety degrees relative to a surface upon which the indicator assembly rests.

19 Claims, 8 Drawing Sheets

(56) References Cited

U.S. PATENT DOCUMENTS

2018/0039272 A1\* 2/2018 Seydoux .............. G05D 1/0088
2018/0247421 A1\* 8/2018 DeAngelis .............. G06T 7/292

\* cited by examiner

VISUAL DISPLAY SYSTEM FOR USE IN TESTING OR MONITORING A GPS ENABLED DEVICE

BACKGROUND

Technical Field

This disclosure relates generally to testing and monitoring systems and assemblies that utilize Global Positioning System (GPS). More particularly, this disclosure is directed to a system that includes one or more GPS receivers.

Background Information

GPS (i.e., Global Positioning System) is a satellite-based radio-navigation system that utilizes signals from multiple satellites orbiting the earth to determine the geographical position of specially-configured devices relative to the earth. The specially-configured devices are known as GPS receivers. GPS receivers are capable of receiving signals from the orbiting satellites and then using that information to calculate the GPS receiver's latitude, longitude, altitude, and time. The calculation of the geographical position by a GPS receiver is known as a "solution".

GPS by its very nature provides geographical positioning that is, at best, an approximation of a GPS receiver's location on the earth. Multiple factors can affect a GPS receivers' ability to determine its location. These factors include but are not limited to the positions of the satellites relative to the GPS receiver, ionospheric distortion of signals from the satellites, and multipath reflections of signals from the satellites. If a GPS receiver receives a GPS signal that has been distorted in some way, then that receiver will ordinarily provide a solution but the position that the GPS receiver determines it is at will be incorrect.

It is currently impossible to know exactly how various factors will distort the calculated position of a GPS receiver and therefore erroneously report the GPS receiver's geographical location. Because of this, there is no way for a system using GPS to know the magnitude of the GPS error that has to be taken into consideration. Typically, any errors can only be determined by logging a GPS receiver's reported position and then later reviewing the logged position to identify positioning errors and the magnitude of the same.

SUMMARY

There is therefore a need in the art for an improved system of identifying GPS error in real time. The system and method disclosed herein provide a real time visual and/or aural indication to a human operator testing a GPS enabled device or to a system utilizing a GPS receiver that a GPS positioning error has occurred. The indicator provided by the disclosed system and method is visually detectable with the human eye in real time. In other examples, the GPS signal error may also be indicated to an operator audibly.

An assembly and method is disclosed herein for detecting and indicating a GPS signal error in a system including a GPS enabled device or unit under test or monitoring.

The assembly in accordance with the present disclosure includes an azimuth-elevation (azel) servo system; a GPS receiver; and a microprocessor engaged with the GPS receiver and servo system. The microprocessor is programmed to compare an expected self-position solution of the indicator assembly with a reported-position solution of the indicator assembly provided by the GPS receiver. If a difference is found between the solutions, the servo system rotates a visually-observable indicator device. The indicator device points to a location on the ground where the GPS receiver thinks its current position is located. An operator noting an anomaly in the device/unit under test can observe the movement of the indicator device in daylight or at night and then utilize the visual information provided by the indicator device to determine if the device under test behaved as it did due to receiving a GPS signal that is erroneous or because of an error in the programming uploaded to the device under test.

By way of example only, if an operator is testing or monitoring a GPS receiver equipped, self-navigating mobile device such as an autonomous driving robot or autonomous driving vehicle, the operator may see the robot or vehicle make a sudden change in a direction while driving along a pre-programmed route. The operator needs to determine if the sudden change in direction is the result of an error in their programming or if the error is in the GPS signal received by the robot or vehicle. The operator could stop the testing of the vehicle and review the GPS log files, as was done in the PRIOR ART systems. However, in accordance with an aspect of the present disclosure, the operator can now simply glance over at an indicator assembly when they see the vehicle suddenly change course and the indicator assembly will visually show them if a GPS signal error has occurred. If the indicator assembly is displaying the visual indicator, the operator then knows the GPS receiver has received a distorted signal. If the indicator assembly is not displaying the visual indicator, then operator knows the vehicle veered off course because of a programming error or because of an error in the system, such as an electrical or mechanical issue.

The presently disclosed system includes a first assembly for providing visual indication of GPS error during the day; and further includes a second assembly for providing visual indication of GPS error during the night. The presently disclosed system therefore is able to provide real time error information to the operator both day and night.

In one aspect, the present disclosure may provide an indicator assembly for detecting and indicating a GPS error in a system that includes a GPS enabled device that is being tested, wherein the indicator assembly comprises an azimuth-elevation (azel) servo system; a Global Positioning System (GPS) receiver; a microprocessor operatively engaged with the GPS receiver and the azel servo system; and an indicator device operatively engaged with the azel servo system and movable by the azel servo system.

In another aspect, the present disclosure may provide a testing system comprising a Global Positioning System (GPS) enabled device; an indicator assembly for detecting and indicating a GPS signal error in real time to an operator testing the GPS enabled device; wherein the indicator assembly comprises an azimuth-elevation (azel) servo system located remote from the GPS enabled device; a GPS receiver that provides a reported-position solution of the indicator assembly; a microprocessor operatively engaged with the GPS receiver and the azel servo system; an indicator device operatively engaged with the azel servo system and movable by the azel servo system; and programming executable by the microprocessor for calculating a difference between an expected self-position solution of the indicator assembly stored in the microprocessor and the reported-position solution of the indicator assembly provided by the GPS receiver; and for activating the azel servo system to move the indicator device in response to the calculated difference between the expected self-position solution of the indicator assembly and the reported-position solution of the indicator assembly.

In another aspect, the present disclosure may provide a method of detecting a Global Positioning System (GPS) error in a system for testing or monitoring a GPS enabled device; wherein the method comprises configuring a GPS receiver on an indicator assembly; providing an expected self-position solution of the indicator assembly to a microprocessor on the indicator assembly; determining a reported-solution position of the indicator assembly with the GPS receiver; comparing, with programming executed by the microprocessor, the reported-position solution of the indicator assembly with the expected self-position solution of the indicator assembly; and moving a visible indicator on the indicator assembly based on the comparison of the reported-position solution of the indicator assembly and the expected self-position solution of the indicator assembly. The method may further comprise testing or monitoring a GPS enabled device; noticing an unexpected action during the testing or monitoring of the GPS enabled device; and visually checking for movement of the visible indicator on the indicator assembly when the unexpected action is noticed. The method may further comprise determining no GPS signal error has occurred when the visible indicator is oriented generally vertically and substantially at right angles relative to a surface upon which the indicator assembly rests. The method may further comprise determining a GPS signal error has occurred if the visible indicator is oriented at an angle other than right angles relative to a surface upon which the indicator assembly rests. The method may include detecting the GPS signal error in real time.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

Similar numbers refer to similar parts throughout the drawings.

DETAILED DESCRIPTION

The present disclosure is directed to an indicator assembly that may be used during testing or monitoring of a GPS enabled device. In one example the indicator assembly includes a GPS receiver and a movable indicator device that provides a real-time indication as to whether or not the GPS enabled device under test is receiving a substantially error-free GPS signal.

Referring to FIGS. 1-5 there is shown a Global Positioning System (GPS) error detection and display system in accordance with the present disclosure, generally indicated at 10. System 10 includes an indicator assembly 12, a satellite 16, and an exemplary GPS enabled device 18 that is under test or is being monitored.

Satellite 16 is shown as a single device but should be understood to be representative of a network of satellites that orbit around the earth and are utilized to provide GPS information to vehicles that travel over the earth, across the sea, and through the air. Satellite 16 sends out a signal 20 that may be able to be picked up by GPS receivers provided in these vehicles so that the latitude, longitude, elevation, and time of the vehicles may be able to be determined.

Figure 2:
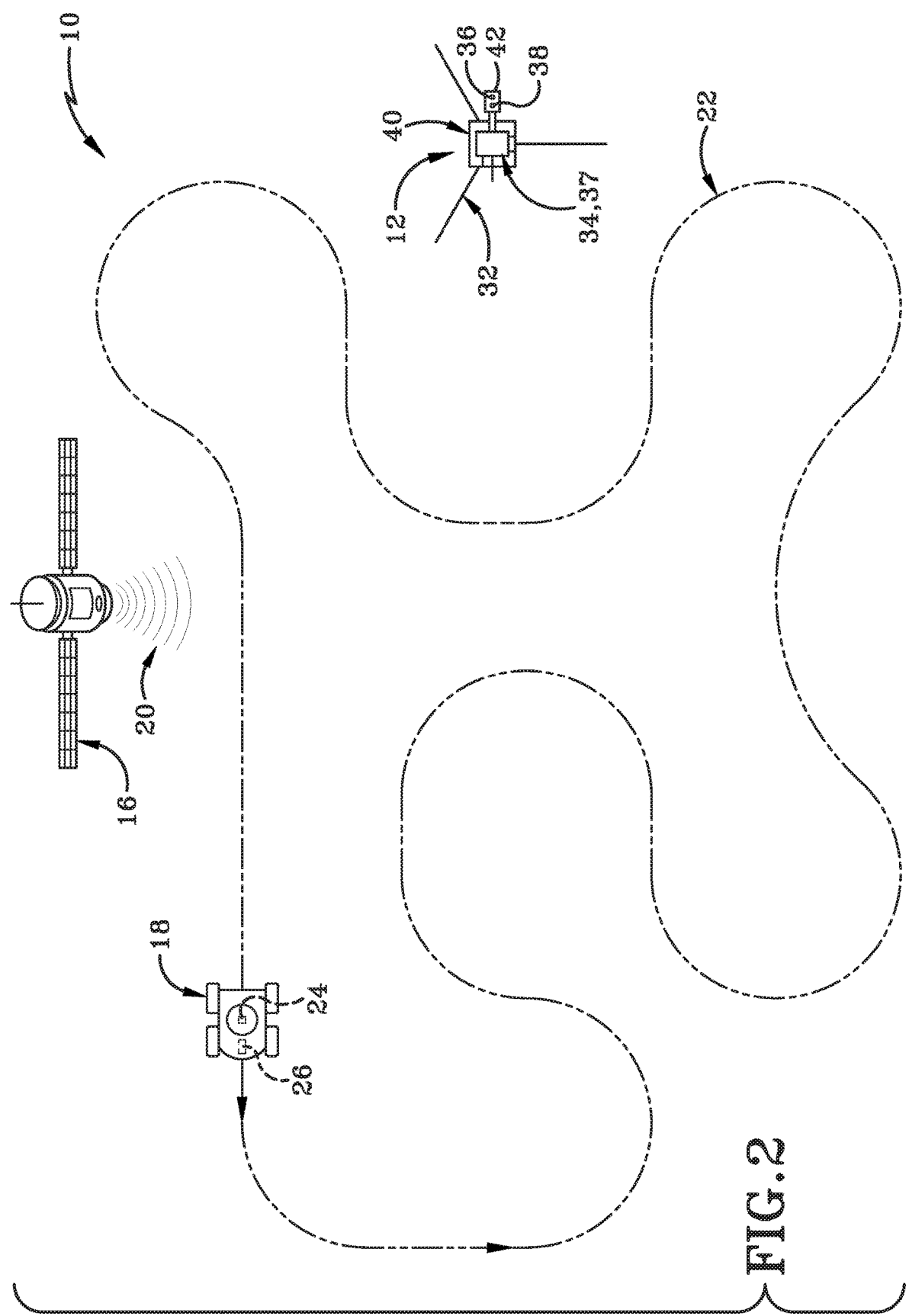
FIG. 2 is a diagrammatic front top view of the GPS error display system of FIG. 1, showing a first embodiment of an indicator assembly used therein.

In one example the GPS enabled device 18 under testing or monitoring may be any device, apparatus, or system that relies on receiving second-by-second GPS coordinates. The GPS enabled device 18 may furthermore be any system that includes programming that uses GPS to determine a self-location in order to properly align internal components to a distant object. It should be understood that indicator assembly 12 may be utilized during testing or monitoring of GPS enabled devices or systems that may include but are not limited to robots, drones, missiles, lasers, and vehicles. The GPS enabled device or system under testing or monitoring might be stationary or it might be moving. By way of example only, the GPS enabled device 18 illustrated and described herein is shown and described as an autonomously-driven vehicle 18, particularly an autonomously driven robot, that is programmed to drive along a predetermined path or route 22 as shown in FIG. 2. The GPS enabled device under test or monitoring will be referred to hereafter as "vehicle 18". Any reference to the described autonomous vehicle 18 herein and the method of using the indicator assembly 12 to indicate GPS signal errors that may be received by a GPS receiver in vehicle 18, should be understood to be substantially applicable to other GPS enabled devices under testing or monitoring.

Figure 1:
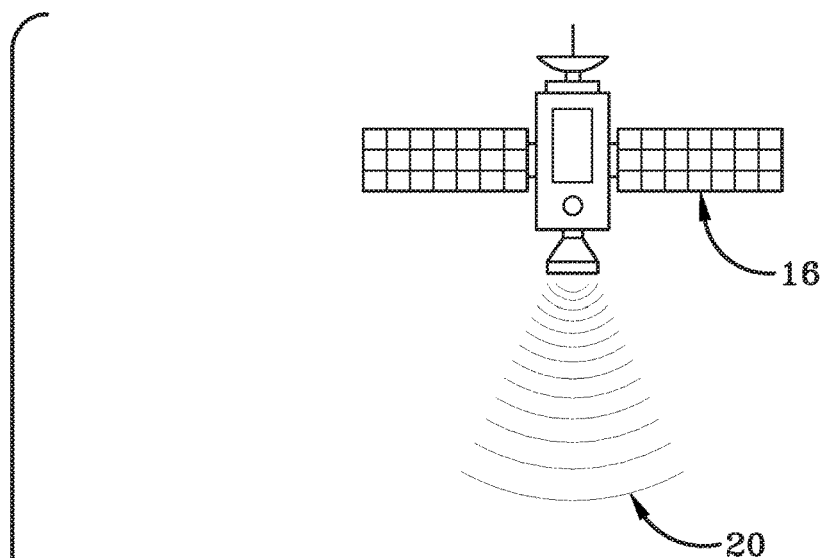
FIG. 1 is a diagrammatic front elevation view of a GPS error display system in accordance with the present disclosure.
Figure 1:
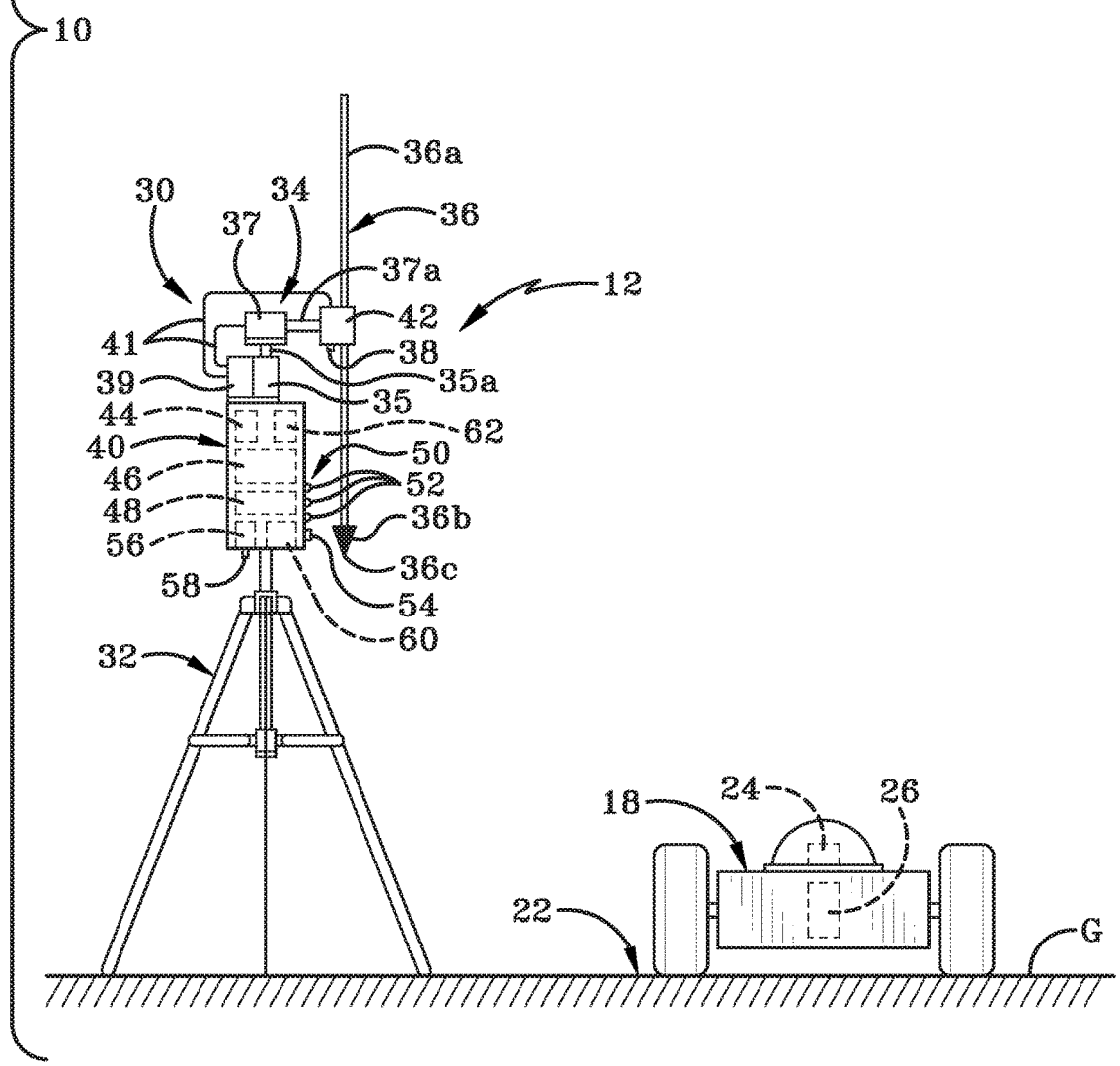

As shown in FIG. 1, vehicle 18 may be provided with a GPS receiver 24 and a microprocessor 26 (FIG. 1) that are operatively engaged with each other. Microprocessor 26 may be provided with programming that includes instructions for vehicle 18 to autonomously drive along route 22 utilizing GPS navigation. Vehicle 18 may also include a number of other components, such as an engine or motor but these are not of particular relevance to the present disclosure and are therefore not discussed herein. GPS receiver 24 on vehicle receives signals 20 from satellite 16. Upon reception of signals 20, GPS receiver 24 calculates a solution, i.e., the latitude, longitude, altitude, and time of vehicle 18. Microprocessor 26 utilizes the solution provided by GPS receiver 24 to aid in navigation of the vehicle 18 along route 22. Course corrections are made by microprocessor 26 based on the location of vehicle 18 according to the GPS receiver 24 relative to the pre-programmed GPS coordinates that were stored in the memory of microprocessor 26 so that vehicle 18 could driving route 22 autonomously.

In one example, a human operator (local or remote) may test vehicle 18 or monitor the vehicle's progress along route 22. Indicator assembly 12 may be utilized by the human operator during the testing or monitoring as will be described later herein.

Figure 1A:
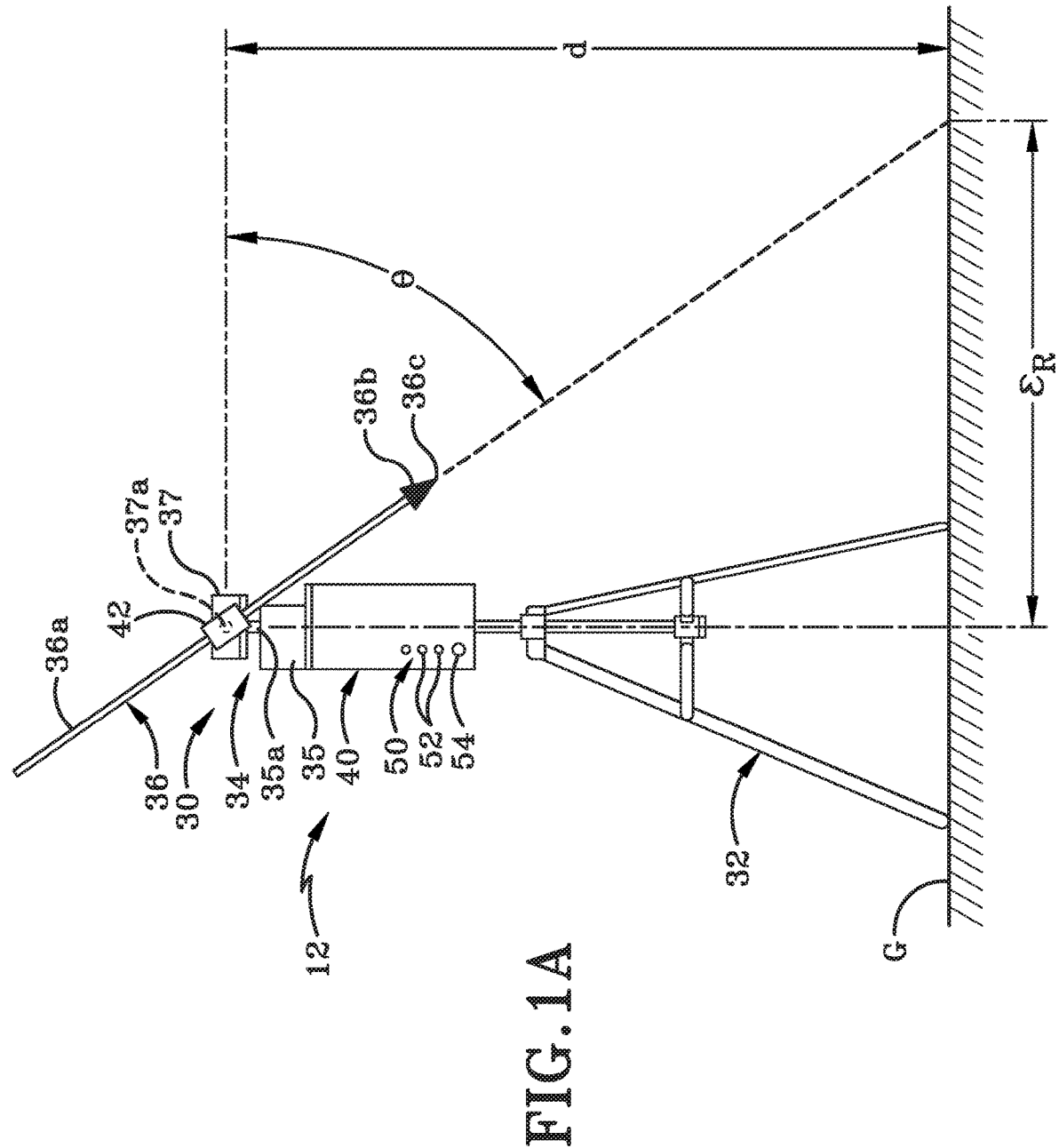
FIG. 1A is a diagrammatic end elevation view of the indicator assembly of the system of FIG. 1, where the indictor assembly is shown on its own and in an orientation where it is detecting a GPS signal error.

Referring to FIGS. 1 and 1A, indicator assembly 12 in this example may comprise an indicator head 30 mounted on a stand 32 that holds indicator head 30 a distance "d" above the ground "G" upon which stand 32 rests. Stand 32, as illustrated, may be a tripod but any other suitable type of stand may be utilized. Stand 32 may be of a type that is adjustable so as to give an operator of the system 10 an opportunity to change the distance "d' between the indicator head 30 and ground "G", as will be discussed later herein.

Indicator head 30 may include an azimuth and elevation servo system (azel servo system) 34, a daytime indicator 36, a nighttime indicator 38, and a control unit 40. The daytime indicator 36 and nighttime indicator 38 may be mounted on a single mounting block 42 that is operatively engaged with the azel servo system 34 and is movable by the system 34. Daytime indicator 36 is contemplated to be used during daylight hours or when sufficient light is available for a human operator, sensor or camera to see daytime indicator 36. Wiring 41 extends from controller assembly 39 to second servo motor 37 and to nighttime indicator 38. (Wiring from controller assembly 39 to first servo motor 35 is present but is not shown in the figures.) Nighttime indicator 38 may be selectively switched on or off so that it is only illuminated at night or when light levels in the vicinity of indicator assembly 12 are low and the daytime indicator 36 cannot readily be observed by the human operator.

The azel servo system 34 may comprise a first servo motor 35, a second servo motor 37, and a servo-motor controller assembly 39 that is operatively engaged with each of the first and second servo motors 35, 37. A first axle 35a connects first servo motor 35 to second servo motor 37. A second axle 37a connects second servo motor 37 to mounting block 42. Daytime indicator 36 and nighttime indicator 38 are mounted on mounting block 42 and therefore azel servo system 34 is operatively engaged with daytime indicator 36 and nighttime indicator 38 via mounting block 42.

The first servo motor 35 may be utilized to perform an azimuth movement function and rotate the second servo motor 37 and thereby mounting block 42 and daytime and nighttime indicators 36, 38 horizontally about a vertical first axis that extends along first axle 35a. The possible rotation of second servo motor 37 and thereby of mounting block 42 and indicators 36, 38 as produced by first servo motor 35 is identified in FIG. 4A by the rotational arrow "H".

The second servo motor 37 may be utilized to perform an elevation movement function and rotate the mounting block 42 and thereby the daytime and nighttime indicators 36, 38 vertically about a horizontal second axis that extends along second axle 37a. The possible rotation of mounting block 42 and indicators 36, 38 by second servo motor 37 is identified in FIG. 4A by the rotational arrow "V".

The second servo motor 37 may rotate from horizontal to vertical over an angle of about 90 degrees. The first servo motor 35 rotates the indicators 36, 38 in azimuth and rotates through a full circle (i.e., 0° through 360°). Azel servo system 34 is therefore operatively engaged with the indicator device (daytime indicator 36 and nighttime indicator 38) to rotate the indicator device one or both of around a vertical axis with the azimuth servo motor 35 and around a horizontal axis with the elevation servo motor 37. A slip ring may connect the first and second servo motors 35, 37 to ensure the rotational motion is relatively smooth and to minimize twisting of wiring 41.

It should be noted with reference to FIG. 1A that the stand 32 can be adjusted to change the distance "d" between the horizontal axle 37a of second servo motor (i.e., the elevation servo motor) and the ground "G" upon which stand 32 rests. This can be done by an operator or by a separate electromechanical system (not shown). If "d" is changed from what the microprocessor 46 thinks "d" is, the resulting position pointed to on the ground by the indicator device (daytime indicator 36 or nighttime indicator 38) will be wrong.

It will be understood that in other examples a single motor may be utilized to drive each of the azimuth movement function and the elevation movement functions instead of utilizing a separate first servo motor 35 and second servo motor 37.

Figure 4A:
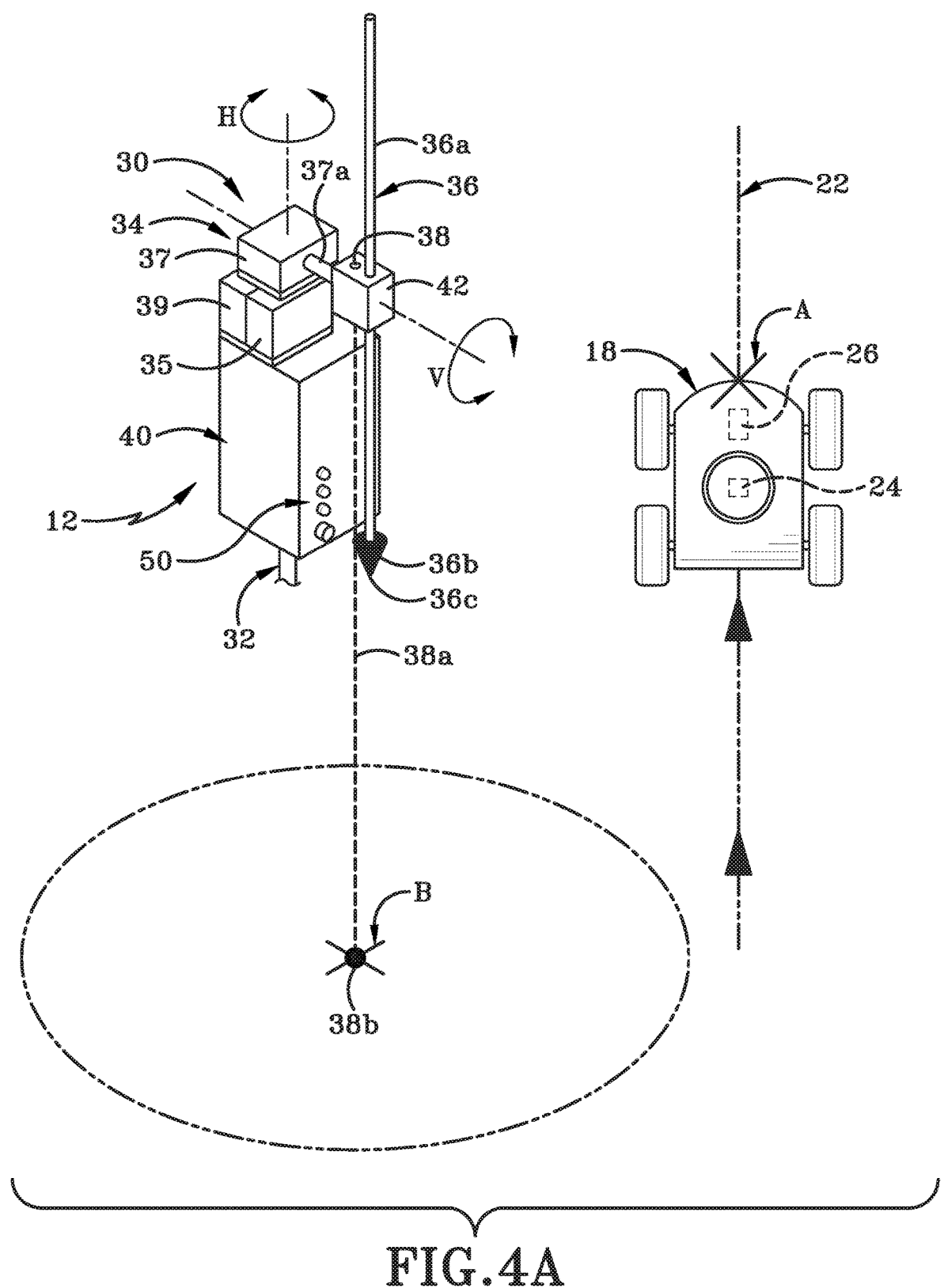
FIG. 4A is a diagrammatic partial perspective view of an indicator head of the indicator assembly along with a top view of an exemplary GPS enabled device that is under test, where the indicator head is positioned to indicate that no GPS signal error is detected.

As shown in FIG. 4A, daytime indicator 36 may comprise a device that has a shaft 36a with an arrowhead 36b at one end of shaft 36a. Shaft 36a may be mounted on mounting block 42 and arrowhead 36b may be located a distance away from mounting block 42. The arrowhead 36b may include a tip 36c. A first portion of shaft 36a may extend above mounting block 42 and a second portion of shaft 36b may extend below mounting block 42. Arrowhead 36b may be provided on the second portion of shaft 36b. The first portion of shaft 36b may be omitted in some examples.

Daytime indicator 36 may be fabricated from a high-contrast material that stands out from the rest of indicator assembly 12 and may be readily discernable by the operator who is located a short distance away from indicator assembly 12. For example, daytime indicator 36 may be fabricated to have a highly reflective exterior surface, or a colored surface, or may be finished in any other fashion that makes it easily seen by the operator. The tip 36c of arrowhead 36b may be used to point in a direction as will be described later herein.

Nighttime indicator 38 may be a visible, eye-safe laser pointer that directs a laser beam 38a out of mounting block 42 and forms a point 38b on the ground "G". The eye-safe laser pointer may be one that emits a visible laser beam. It should be noted that the laser beam 38a of nighttime indicator 38 and the tip 36c of the arrowhead 38b of the daytime indicator 36 point in substantially the same direction at all times.

FIG. 1 shows that control unit 40 forms an integral part of indicator head 30 of indicator assembly 12. Control unit 40 includes a GPS receiver 44, a power source 46 (or power input), a microprocessor 48, a user interface 50 including one or more Light Emitting Diodes (LEDs) 52, a control button 54, a slot 56 for receiving a memory card 58, and a communication port 60.

GPS receiver 44 may be any suitable device such as a GPS module made by u-Blox of Thalwil, Switzerland, or a military SAASM unit like the GB-GRAM or Micro-GRAM units made by Rockwell Collins of Cedar Rapids, Iowa, US. The GPS receiver 44 may also be of a type that incorporates an antenna (not shown) as part of the receiver 44. It will be understood that a separate antenna may, alternatively, be utilized with the GPS receiver 44.

Power source 46 may comprise a battery such as a lithium-ion battery pack. The battery pack may be replaced when needed. Other means of powering indicator assembly 12 may be utilized including plugging indicator assembly 12 into a remote power source or via existing power sources on an aircraft, vehicle, or ship.

User interface 50 on indicator assembly 12 may be relatively simple and take the form of a few status LEDs 52 and control button 54. The status LEDs 52 may indicate if the GPS receiver 44 has acquired satellite 16 and is outputting a solution; if the GPS receiver 44 has acquired the almanac to increase its position accuracy; and, in some instances, if the GPS receiver 44 is providing a Wide Area Augmentation System (WAAS) augmented solution.

As mentioned above, control unit 40 may include a slot 56 for a memory card 58. All data received by GPS receiver 44 may be logged to the memory card 58 for later analysis.

Communication port 60 may be utilized to receive a cable for temporarily connecting control unit 40 to a computer and thereby providing a wired communication channel therebetween. Primarily, such a communication channel may be used to configure the control unit 40. Once indicator assembly 12 is configured, then the cable may be detached from communication port 60.

Indicator assembly 12 may further include a sound-generating device 62 that may be provided as part of control unit 40 as shown in FIG. 1. Sound-generating device 62 may be utilized to provide aural notification to the operator if the GPS signal being received by vehicle 18 is adversely affected or is erroneous in some way. Sound-generating device 62 may emit a tone that may be varied in accordance with the magnitude of GPS signal error computed by microprocessor 48 as will be described hereafter. For example a lower tone could be emitted to indicate a smaller GPS error has occurred while a higher tone could be emitted to indicate a larger GPS error has occurred. Utilizing the sound-generating device might allow for "eyes-free" feedback to the operator and could be used when even glancing over to the indicator assembly 12 might be constraining for the operator. In other instances, the sound-generating device may be separate from control unit 40 on indicator head 30 but may still be operatively engaged with and controlled by programming executed by microprocessor 48.

GPS receiver 44 is configured prior to use of indicator assembly 12. GPS receiver 44 may be configured in a first instance by a human operator temporarily linking indicator assembly 12 to a computer and then entering the latitude, longitude, altitude, and time at which indicator assembly 12 is to be used. That entered information is stored in microprocessor 48. In another instance, GPS receiver 44 may be configured by the operator depressing control button 54 on indicator assembly 12. When this is done, GPS receiver 44 seeks and finds satellite 16 and calculates a solution i.e., the position of indicator assembly 12 on the earth. In some instances, button 54 may be depressed several times in a row and GPS receiver 44 may take several readings of its position and then stores an average of that information in the microprocessor 48. Control button 54 may also be utilized to allow the human operator to reset the averaging statistics of the GPS receiver 44.

The information from configuring or resetting GPS receiver 44 is stored in microprocessor 48 as an "expected self-position solution of indicator assembly 12". In other words, the solution stored in microprocessor 48 as the expected self-position solution of indicator assembly 12 is the location on the earth where the indicator assembly 12 expects to be.

Once configured, GPS receiver 44 may be utilized to substantially continuously determine the position of indicator assembly 12 on the earth. In other words, GPS receiver 44 calculates a solution, in real time, of where the indicator assembly 12 is located. This solution will be further referred to herein as a "recorded position solution of indicator assembly 12". If the signals 20 from satellite 16 are not affected or erroneous in any way, the "expected self-position solution of indicator assembly 12" and the "recorded position solution of indicator assembly 12" will be one and the same. In other words, the GPS receiver 44 expects to be at a certain location on the earth and when it calculates a solution in real time it is located at that expected position. In other instances, the "recorded position solution of indicator assembly 12" is different from the "expected self-position solution of indicator assembly". In other words, the GPS receiver 44 expects to be at a certain location on the earth but when it calculates a solution in real time, the GPS receiver determines it is not at the location it expected to be at but is instead at a different location from what was expected. The indicator assembly 12 in accordance with the present disclosure utilizes the expected self-position solution of indicator assembly 12 and the recorded position solution of indicator assembly 12 to physically and visually signal to a human operator if a GPS error is detected by the indicator assembly 12. The way indicator assembly 12 is utilized during testing of a GPS enabled device will be discussed hereafter.

Microprocessor 48 of indicator assembly 12 may be programmed to configure the GPS receiver 44 if needed. As indicated above, position, time, and status information from the configured GPS receiver 44 may be received and stored by microprocessor 48. Microprocessor 48 also includes programming for controlling the azel servo system 34 to rotate mounting block 42 one or both of horizontally and vertically, thereby changing the direction in which daytime indicator 36 and nighttime indicator 38 point. As indicated above, when indicator assembly 12 is utilized, GPS receiver 44 will receive signals 20 from satellite 16 in real time and will provide a real time solution. Microprocessor 48 may further include programming that compares the expected self-position solution of indicator assembly 12 with the reported position solution of the indicator assembly 12. Microprocessor will then execute its programming and drive the azel servo system 34 to position the indicator device (indicators 36, 38) in an orientation that reflects the results of the comparison between the expected self-position and reported position solutions of the indicator assembly 12.

Figure 3:
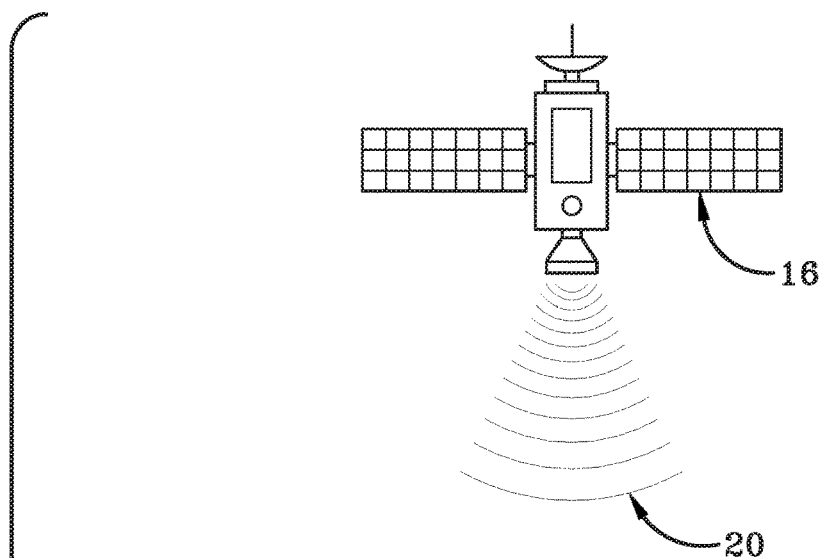
FIG. 3 is a diagrammatic front elevation view of the GPS error display system in accordance with the present disclosure showing a second embodiment of an indicator assembly that forms part of the system.
Figure 3:
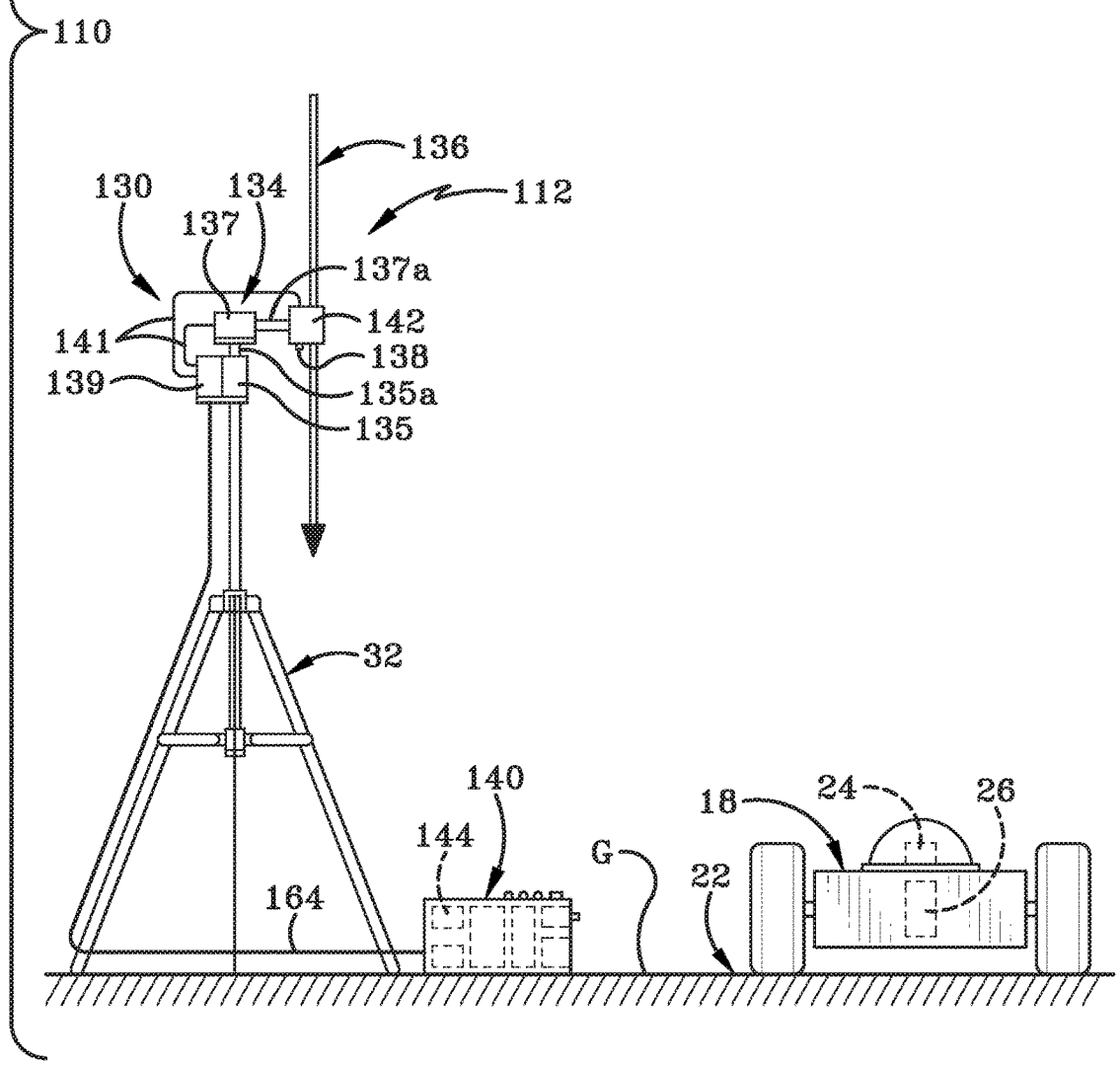

FIG. 3 shows a system 110 that may be substantially identical in structure and function to system 10 except that the system 110 includes a second embodiment of an indicator assembly, generally indicated at 112, instead of indicator assembly 12. Indicator assembly 112 may be substantially identical in structure and function to indicator assembly 12 except that the control unit 140 is not integral with the indicator head 130 but is, instead, separate therefrom. As a result, the indicator head 130 includes an azel servo system 134 (including first and second servo motors 135, 137, and first and second axles 135a, 137a, respectively), a mounting block 142, a daytime indicator 136, and a nighttime indicator 138. Wiring 141 connects controller assembly 139 to nighttime indicator 138 and to servo motor 137. Indicator head 130 is mountable on a stand 32.

The control unit 140, which may include all the same components as control unit 40, including a GPS receiver 144, may be located a distance away from stand 32 and may be connected to indicator head 130 by a cable 164. In another example that is not illustrated herein, the GPS receiver 144 may be provided on the indicator head 130 instead of in the control unit 140 and the GPS receiver 144 may therefore be provided along with servo system 134, daytime indicator 136, and nighttime indicator 138 on stand 32.

The control unit 140 is illustrated as being hard-wired to the azel servo system 134. In another example, there may be a wireless connection between control unit 140 and azel servo system 134.

The use of the GPS error display system in accordance with the present disclosure will now be described in reference to system 10 that includes indicator assembly 12. It will be understood, however, that this description applies equally to the use of the system 110.

Prior to testing or monitoring of the GPS-enable vehicle 18, microprocessor 26 in vehicle 18 may be pre-programmed to autonomously drive along route 22. During testing, GPS receiver 24 in vehicle 18 receives signals 20 from satellite 16 and calculates a solution. The microprocessor 26 in vehicle 18 may navigate and correct the travel of vehicle 18 along route 22 utilizing this solution calculated by GPS receiver 24. If the GPS signal 20 is erroneous in some manner, vehicle 18 may behave in some unexpected way, e.g. suddenly veering off course (i.e., off route 22), and then possibly veering back onto route 22. The operator who is testing or monitoring vehicle 18 may notice the sudden, unexpected behavior of vehicle 18. It is at this time during the testing that the operator may refer to the indicator assembly 12 to try and determine whether the unexpected behavior of vehicle 18 is the result of a GSP error or another type of error in the system, such as a programming error or an electrical or mechanical error. In other words, did the GPS receiver 24 receive an erroneous GPS signal 20 that made the receiver 24 "think" it was at a different location on the earth and so the vehicle 18 moved towards where the GPS receiver 24 told the vehicle it should be located; or does the programming in the microprocessor 26, for example, contain a software mistake that told the vehicle 18 to drive off the route 22 at that particular moment; or was there possibly an issue with a steering linkage or some other type of mechanical or electrical issue with vehicle 18.

It should be noted that if the GPS enabled device is a different from vehicle 18, such as a laser that uses GPS signals to lock on to a remote object, then the unexpected behavior observed by the operator may take the form of the laser wandering around instead of being focused on a particular target. Upon noticing this unexpected behavior, an operator testing the laser could utilize the indicator assembly 12 in a substantially similar manner as will be described hereafter.

The GPS receiver 44 in indicator assembly 12 is configured so that the latitude, longitude, and altitude of the indicator assembly 12 is known, as is the time this information was provided to GPS receiver 44. As indicated earlier herein, the position of the indicator assembly 12 is stored as the "expected self-position solution of indicator assembly 12" information in the microprocessor 48. GPS receiver 44 in the indicator assembly 12 continuously receives signals 20 from satellite 16 and calculates a real time solution that is compared with the expected self-position solution of indicator assembly 12. Microprocessor 48 computes if there is any difference between the reported-position solution and the expected self-position solution of the indicator assembly 12. If no difference is found, then programming executed by microprocessor 48 causes azel servo system 34 to drive the daytime indicator 36 and nighttime indicator 38 to point in a direction normal (i.e., at right angles) to the second axle 37a and normal to the ground "G" upon which the indicator assembly 12 stands. If a difference is found between the expected self-position solution of indicator assembly 12 and the reported-position solution of indicator assembly 12, then programming executed by microprocessor 48 causes azel servo system 34 to drive the daytime indicator 36 and nighttime indicator 38 to point to a location on the ground "G" that is spaced a distance laterally away from where the indicators 36, 38 point when there is no calculated difference between the solutions.

Figure 4B:
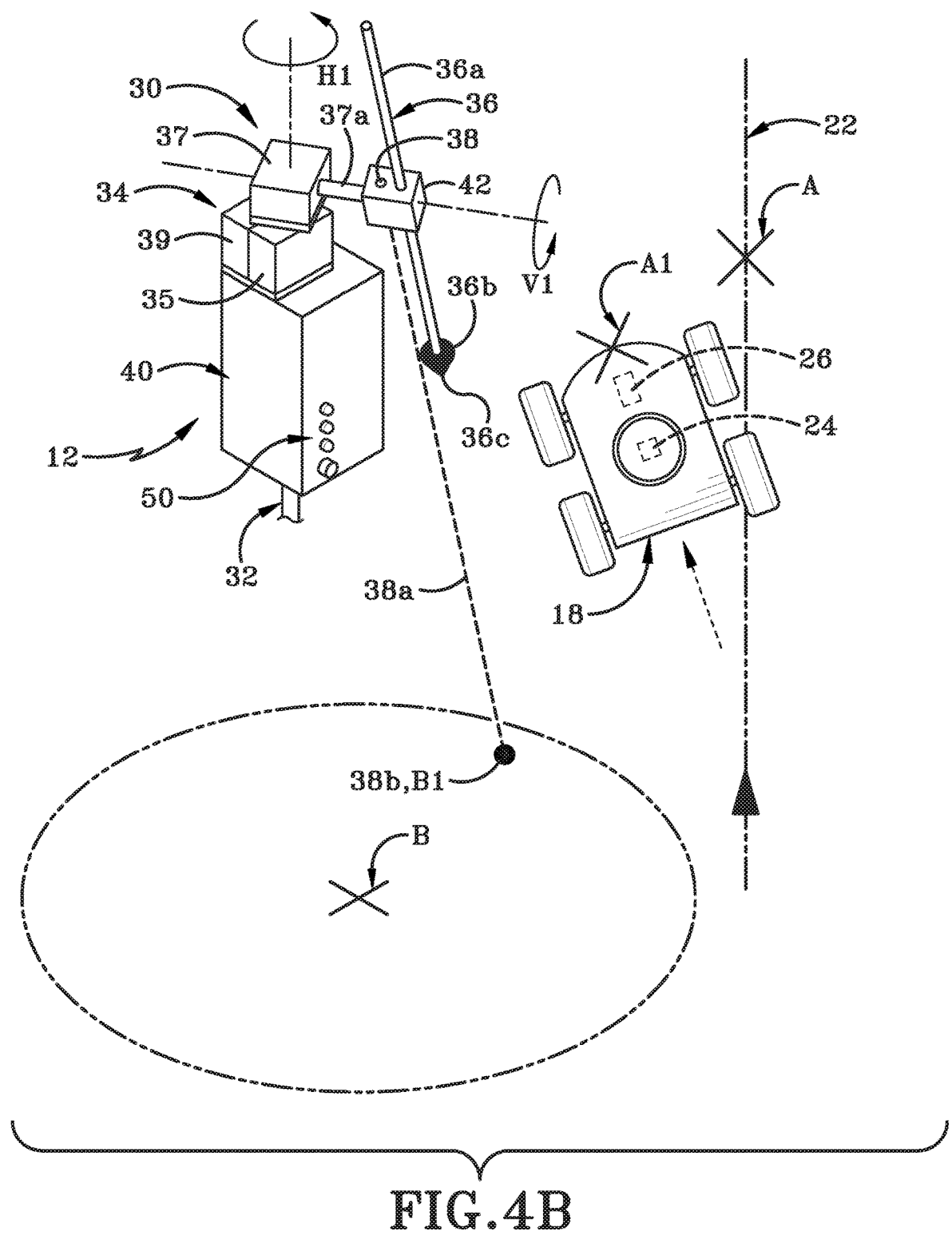
FIG. 4B is a diagrammatic partial perspective view of the indicator head of the display system along with a top view of the exemplary GPS enabled device that is under test, where the indicator head has moved to indicate that a possible GPS signal error is detected.
Figure 4C:
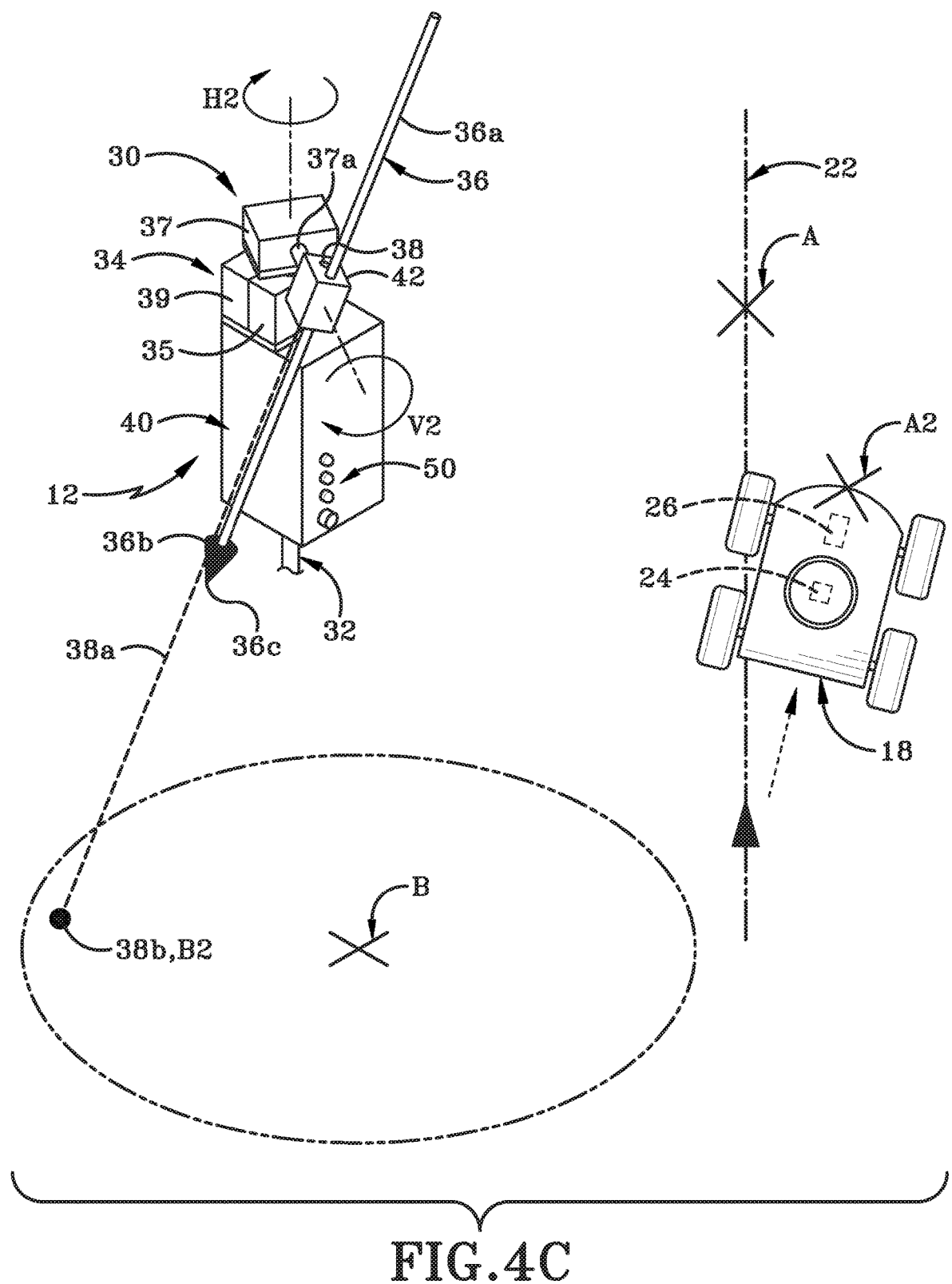
FIG. 4C is a diagrammatic partial perspective view of the indicator head of the display system along with a top view of the exemplary GPS enabled device that is under test, where the indicator head has moved to a different position to indicate that a possible GPS signal error is detected.

FIGS. 4A through 4C show in greater detail how indicator assembly 12 may be utilized by a human operator testing or monitoring vehicle 18 traveling along route 22.

FIG. 4A illustrates an "X" on the route 22 traveled by vehicle 18 and another "X" on the ground "G" adjacent indicator assembly 12. (While indicator assembly 12 and vehicle 18 are shown proximate each other in these figures, it will be understood that they are spaced much further apart from each other during testing of vehicle 18.) The "X" on route 22 is identified by the reference number "A" and the "X" indicates that actual-location of vehicle 18 as determined by the vehicle's GPS receiver 24 and the expected location of vehicle 18 as stored in the vehicle's microprocessor are one and the same. In other words, the vehicle 18 is traveling the pre-programmed route 22 correctly and is where it was expected to be at a particular time. The human operator monitoring or testing vehicle 18 would form the opinion that the vehicle was performing exactly as expected and might have no need for the indicator assembly 12 at that time.

However, if the human operator glanced over at the indicator assembly 12, he or she would see the daytime indicator 36 oriented at ninety degrees relative to axle 37a. The "X" below the daytime indicator 36 and nighttime indicator 38 of the indicator assembly 12 in FIG. 4A is identified by the reference number "B". This "X" ("B") shows the position toward which tip 36c of arrowhead 36b and laser beam 38a point on the ground "G". When GPS receiver 44 on indicator assembly 12 calculates a solution in real time, i.e., the reported-position solution of the indicator assembly 12 the microprocessor 48 in indicator assembly 12 compares the reported-position solution with the expected self-position solution of the indicator assembly 12 stored in microprocessor and the two solutions are one and the same, the programming executed by microprocessor 48 will activate azel servo system 34 to move mounting block 42 and thereby indicators 36, 38 into the position shown in FIG. 4A. In other words, the GPS coordinates for indicator assembly 12 saved in the microprocessor 48 are exactly matched by the GPS coordinates received by GPS receiver 44 as the solution. The indicator assembly 12 "thinks" it is in the position on the earth that it was told it should be at. The vertically-oriented indicator 36, 38 on indicator assembly will therefore tell the human operator that the GPS signal 20 being received by vehicle 18 is true, i.e., not erroneous.

FIG. 4B shows a different scenario. In this instance, the vehicle 18 is illustrated as having veered off the route 22 that it was supposed to be driving along. The "X" on the course 22 identified by the reference number "A" in FIG. 4B shows the position the vehicle 18 was supposed to be at according to the programming located into the vehicle's microprocessor 26. The "X" identified by the reference number "A1" in FIG. 4B shows the actual location of the vehicle 18. There is therefore a discrepancy between where the vehicle 18 is located and where it was supposed to be. The human operator noticing this anomaly needs to know if the vehicle 18 is off course because the GPS signal 20 it is receiving is erroneous or, for example, if the programming located into the vehicle's microprocessor 26 contains a programming error. In order to assist in this determination, the human operator can look over to the indicator assembly 12 in accordance with the present disclosure. As described before, the GPS receiver 44 in the indicator head 30 receives signals 20 from satellite 16 and utilizes the information to determine the reported-position solution of the indicator assembly 12. Microprocessor 48 in indicator assembly 12 compares the reported-position solution of the indicator assembly 12 with the stored expected self-position solution of the indicator assembly 12 and calculates the difference between the two solutions. In this particular instance, a difference is calculated by the microprocessor 48. As a consequence, the programming in microprocessor 48 activates azel servo system 34 in order to move the indicator device (daytime indicator 36 and/or nighttime indicator 38) away from the orientation shown in FIG. 4A to a new orientation that will signal to the human operator that a GPS error has been detected.

When azel servo system 34 is activated, one or both of the first servo motor 35 and second servo motor 37 is activated. If the calculated difference between the solutions indicates that the indicator assembly 12 is at a different latitude for example, then the first servo motor 35 may be activated to rotate the second servo motor 37 and mounting block 42 about the vertically-oriented axis that extends along first axle 35a. The position of the "X" on the ground "G" adjacent indicator assembly 12 and identified by the letter "B" will then move on the ground in such a way as to generally correspond with the latitude where the reported-position solution said the indicator assembly 12 should be located.

If the calculated difference between the solutions indicates that the indicator assembly is at a different longitude, then the second servo motor 37 may be actuated to rotate mounting bock 42 about the horizontally oriented axis that extends along second axle 37a. The position of the "X" on the ground "G" adjacent indicator assembly 12 and identified by the letter "B" will then move on the ground in such a way as to generally correspond with the longitude where the reported-position solution said the indicator assembly 12 should be located.

FIG. 4B shows a situation where the reported-position solution provided by GPS receiver 44 indicates the indicator assembly 12 is at a different latitude and longitude from the expected self-position solution of the indicator assembly 12. Consequently, the first servo motor 35 has rotated in a direction "H1" and the second servo motor 37 has rotated in a direction "V1" and the indicators 36, 38 now point to a position "B1" on the ground "G" instead of pointing towards the "X" identified by the letter "B". It should be noted that the degree of rotation of one or both of the azimuth servo motor 35 and elevation servo motor 37 is dictated by the magnitude of the difference in the solutions as calculated by microprocessor 48. Rotation of mounting block 42 causes daytime indicator 36 and nighttime indicator 38 to move simultaneously so that they both will point to substantially the same location on the ground "G".

An operator glancing over at indicator assembly 12 after noticing an anomaly in the movement of vehicle 18 will see the new orientation of the indicators 36, 38 relative to the ground "G". The operator may therefore realize that the indicator assembly 12 is showing him or her that an erroneous GPS signal 20 has been detected. In other words, the GPS receiver 44 in indicator assembly 12 is identifying that it is being told by satellite 16 that indicator assembly 12 is at a different location on the earth from where the indicator assembly 12 was expected to be. The operator can then determine that if the indicator assembly 12 received an erroneous GPS signal 20 then so did the GPS receiver 24 in vehicle 18 and this is the reason the vehicle 18 veered off course.

FIG. 4C shows another instance of the vehicle 18 veering off route 22 but in a different direction from what is illustrated in FIG. 4C. The expected position of vehicle 18 on route 22 is shown by the "X" identified by the reference number "A". The actual location of the vehicle 18 once it has veered off route 22 is shown by the "X" identified by the reference number "A2". This unexpected movement of vehicle 18 will be noticed by the observing human operator and he or she can then look over at the indicator assembly 12 to see if the indicator assembly 12 is showing a GPS error has been detected. As with the previous example, the GPS receiver 44 in the indicator assembly 12 receives GPS signal 20 and outputs a solution, i.e., the reported-position solution of the indicator assembly 12. The reported-position solution of the indicator assembly 12 is compared by the microprocessor 48 to the expected self-position solution of the indicator assembly 12 stored in microprocessor 48. Any difference between the two solutions is calculated and the azel servo system 34 is activated to position the daytime indicator 36 and nighttime indicator 38 in an orientation that reflects the result of the comparison between the two solutions.

FIG. 4C shows that first servo motor 35 has rotated second servo motor 37 and mounting block 42 about the vertical axis extending along first axle 35a and in a direction indicated by arrow "H2". FIG. 4C further shows that second servo motor 37 has rotated mounting block 42 about the horizontal axis extending along second axle 37a and in a direction indicated by "V2". The daytime and nighttime indicators 36, 38 now point to a new location "B2" that is laterally spaced from the location "B" and is different from the location "B1" shown in FIG. 4B. The fact that the indicators 36, 38 are no longer oriented at right angles to the ground "G" but are instead at an angle other than ninety degrees relative to ground "G" will show the operator that an error in GPS signal 20 has been detected by indicator assembly 12.

In summary, if the operator notices that the vehicle 18 has unexpectedly veered off route 22, he or she can glance over at the indicator assembly 12 and if the daytime indicator 36 or nighttime indicator 38 is not vertically-oriented relative to the ground "G", then the operator knows that the GPS receiver 24 in vehicle 18 likely received an erroneous GPS signal 20 from satellite 16. If, on the other hand, the vehicle 18 unexpectedly veered off route 22 but the daytime indicator 36 and nighttime indicator 38 remains vertically oriented, i.e., in the position shown in FIG. 4A, then the operator may be able to surmise that the programming for autonomously driving vehicle 18 around route 22 contains a programming error or that there is some other type of mechanical or electrical problem with the vehicle 18. The time that the vehicle 18 veered off course can then be noted by the operator and at a later time the programming for driving vehicle 18 around route 22 can be checked and corrected and/or vehicle 18 may be checked for other issues related to the vehicle itself.

It should be noted that the direction in which the daytime and nighttime indicators 36, 38 point indicates to the operator the general direction where the signal 20 told the GPS receiver 44 that the indicator assembly 12 was located on the earth. If the vehicle 18 veered off route 22 in an opposite direction to the direction in which daytime indicator 36 or nighttime indicator 38 is pointing, then the operator may determine that the vehicle's veering off course might be a combination of a programming, mechanical and/or electrical issue and an affected or erroneous GPS signal 20. If the direction in which the vehicle veers off route 22 and the direction indicated by indicator assembly 12 generally correspond, then the operator may surmise that only a GPS signal error has occurred and the programming for autonomously driving the vehicle 18 is likely correct.

As mentioned earlier herein, indicator assembly 12 may additionally generate a sound using sound-generating device 62. If the difference between the solutions is determined by the microprocessor 48 to be relatively small then a tone of a sound or a volume of the sound generated by sound-generating device on indicator assembly 12 may be lower and/or softer. If the difference between the solutions as determined by microprocessor 48 is relatively larger, then the tone of the sound and/or the volume of the sound generated by the sound-generating device 62 may be higher and/or louder. Sounds made by sound-generating device 62 may aid the human operator in determining whether or not a GPS signal error has been detected by indicator assembly 12 or not.

It will be understood that in some examples, in addition to daytime indicator 36 and nighttime indicator 38, indicator assembly 12 may further include a scaled elevation display. The elevation display may be in the form of a scaled vertical belt that may be at the same height as the indicator head 30. An arrow might be provided on the belt to indicate an amount of vertical error registered by GPS receiver 44.

Figure 5:
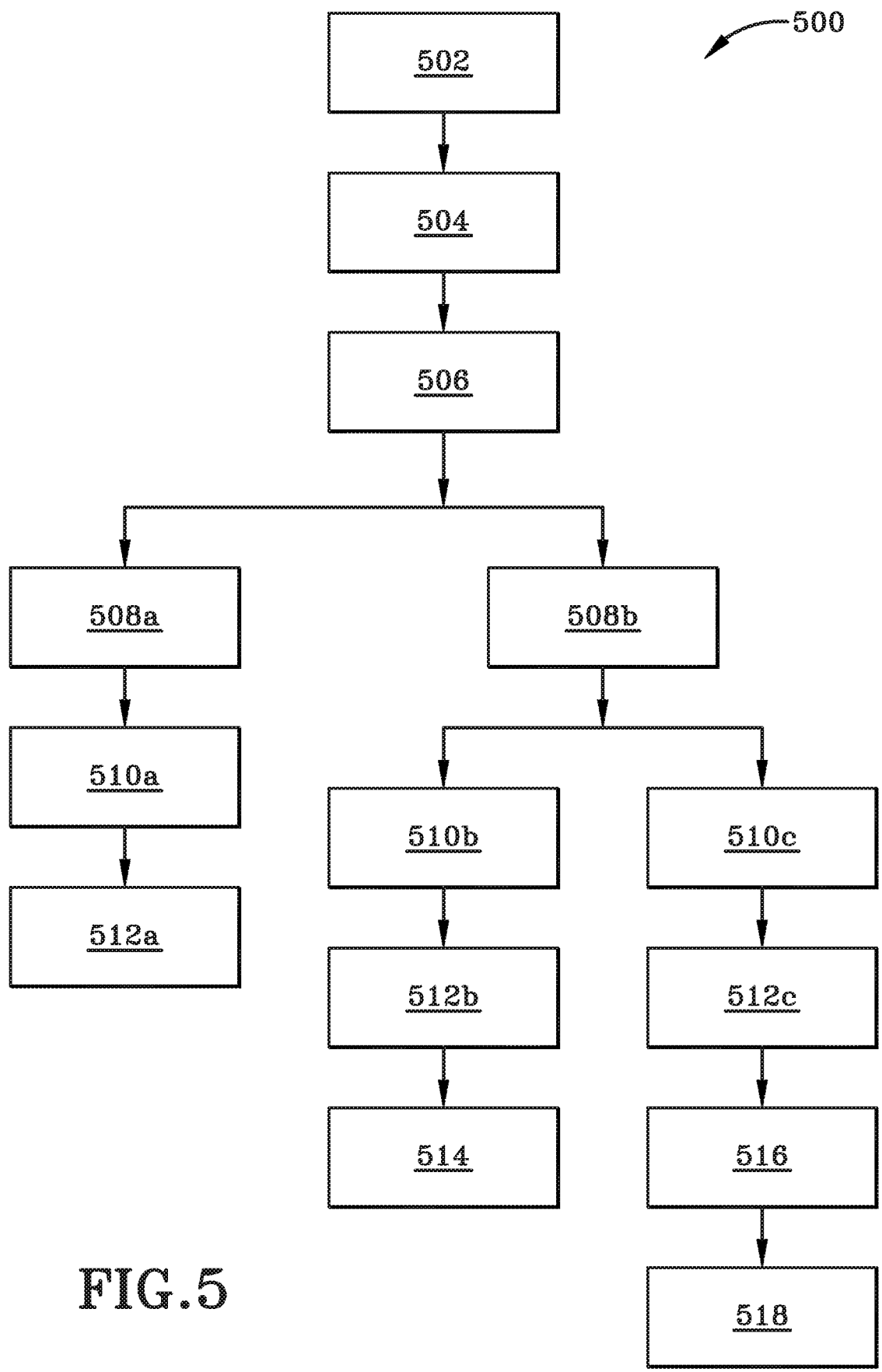
FIG. 5 is a flow chart showing a method of using the indicator assembly.

FIG. 5 is a flowchart showing a method 500 of how the system 10 functions. In a first step 502, indicator assembly 12 is setup. The setup may include, but is not limited to, placing stand 32 on ground "G" some distance away from where the operator will observe vehicle 18. Indicator assembly 12 should be sufficiently close enough for an operator testing or monitoring vehicle 18 to observe the indicator 36 or 38 with relative ease.

The setup step 502 may further include adjusting stand 32 so that the axle 37a extending outwardly from second servo motor 37 is located a distance "d" from the ground "G".

The setup step 502 may further include aligning indicator assembly 12 to north so that the distance "d" to ground "G" will be accurate. In particular, the zero point of the azimuth servo motor must be aligned to north. If this step is not undertaken, then a GPS error that is actually toward the east may erroneously be displayed by indicator device 36 as being directed toward the west or the south instead of toward the east. Aligning indicator assembly 12 to north may be accomplished in a number of ways including but not limited to utilizing a pocket compass that is separate from indicator assembly 12 and a scribe line provided on the indicator assembly 12. Using the pocket compass, the operator may figure out where north is and then rotate stand 32 until the aforementioned scribe line on indicator assembly 12 aligns with north on the compass. In other instances, indicator assembly may have a built-in magnetic compass, or even an electronic compass. With an electronic compass, the microprocessor 46 could determine the required orientation and adjust the system such that the operator would not need to take further action.

In order to get tip 36c of daytime indicator 36 to point to the correct spot or location on ground "G", microprocessor 46 is programmed to perform a few simple calculations to set an azimuth and elevation position of the azimuth servo motor 35 and elevation servo motor 37, respectively. The equations take the error in latitude and longitude and compute the azimuth and elevation angles for the servos 35, 37. In order for this to be accurate, the zero point of the azimuth servo 35, i.e., the position the servo 35 goes to when you ask for a zero angle) need to align to north. This is why step 502 is undertaken. (Besides aligning the servos 35, 37 to north, to get an accurate position, the distance 'd' needs to set properly.)

Referring to FIG. 1A, the equations calculated by microprocessor 46 are as follows:

$$\epsilon_{LAT} = LAT_{GPS} - LAT_{EXPECTED} \quad \text{a)}$$

$$\epsilon_{LON} = LON_{GPS} - LON_{EXPECTED} \quad \text{b)}$$

where a) and b) determine the current GPS error in degrees. The operator must also calculate:

$$\epsilon_{NS} = \epsilon_{LAT} \cdot 60 \cdot 6076.12 \quad \text{c)}$$

$$\epsilon_{EW} = \epsilon_{LON} \cdot 60 \cdot 6076.12 \cdot \cos(LAT_{EXPECTED}) \quad \text{d)}$$

$$\epsilon_R = \sqrt{\epsilon_{NS}^2 + \epsilon_{EW}^2} \quad \text{e)}$$

$$\theta = ATAN\ 2(d, \epsilon_R) \quad \text{f)}$$

$$\Psi = ATAN\ 2(\epsilon_{NS}, \epsilon_{EW}) \quad \text{g)}$$

Steps a) and b) above give the operator the error in GPS position measured in degrees.

Steps c) and d) above use a simple flat earth model to convert the error in degrees into feet. The operator may utilize more complex spheroid and datum corrections if desired.

Step e) above computes the distance from center to GPS location. The center in question is the spot on the ground directly below the axis on the azimuth servo motor; in other words, the center of the tripod legs that is indicated by the reference letter "B" in FIG. 4A.

Step f) above computes the elevation angle θ. θ=0 is horizontal.

Step g) above computes the heading angle ψ. ψ=0 is north.

In a next step 504, the GPS receiver 44 in indicator assembly 12 is configured and the expected self-position solution of the indicator assembly 12 is saved in microprocessor 48.

In a further step 506, testing of vehicle 18 begins.

In step 508a, vehicle 18 is noticed by operator to remain on the programmed route 22. In step 510a, the reported-position solution of indicator assembly 12 is compared in microprocessor 48 with the expected self-position solution of indicator assembly 12 and is found to be one and the same. In a step 512a, the azel servo system 34 of indicator assembly 12 drives daytime indicator 36 and nighttime indicator 38 into a position where the shaft 36 of daytime indicator 36 is oriented vertically and normal relative to the second axle 37a and to ground "G".

In another scenario stemming from third step 506, during testing the vehicle 18 begins to travel along route 22 but in step 508b vehicle 18 unexpectedly veers off the predetermined route 22. In step 510b, the reported-position solution of indicator assembly 12 is compared in microprocessor 48 with the expected self-position solution of indicator assembly 12 and is found to be different. In a next step 512b, the azel servo motor 34 is activated by microprocessor 48 executing its programming. Azel servo motor 34 rotates the mounting block 42 and therefore moves the daytime indicator 36 and nighttime indicator 38 about one or both of axes extending along axles 35a, 37a. Shaft 36a of daytime indicator 36 is therefore moved to an orientation where it is at an angle other than ninety degrees relative to the ground axle 37a and ground "G".

In step 514, an operator observes the unexpected movement of vehicle 18 in step 508b and glances over at indicator assembly to observe the position of daytime indicator 36 and nighttime indicator 38 that has been moved in step 510b. The operator sees that the daytime indicator 36 and nighttime indicator 38 (if switched on) are not oriented normal to the ground "G" and therefore and determines that a GPS signal error was responsible for the vehicle 18 veering off the pre-determined route 22. The observation of the vehicle 18 and of the position of the daytime and nighttime indicators 36, 38 happen in real time and substantially simultaneously.

In yet another scenario stemming from step 508b, in a step 510c, the reported-position solution of indicator assembly 12 is compared in microprocessor 48 with the expected self-position solution of indicator assembly 12 and is found to be one and the same. In a step 512c, the azel servo motor 34 drives the daytime indicator 36 and nighttime indicator 38 to a position where they are vertically oriented relative to the ground "G", i.e., at ninety degrees relative to ground "G". In a subsequent step 516, the operator observes an anomaly of the vehicle 18 veering off route 22 and looks over at the indicator assembly 12 to determine the position of daytime and nighttime indicators 36, 38. The operator notes that the daytime and nighttime indicators 36, 38 are oriented normal to ground "G" and notes that a GPS signal error was not responsible for the vehicle 18 unexpectedly veering off course and therefore determines that the vehicle 18 must have strayed from route 22 because of some other problem unrelated to the GPS signal. In a further step 518, the operator later checks the vehicle and the vehicle's programming and corrects any located issues.

It will be understood that indicator assembly 12 may be utilized any time fast visual and/or audio feedback on the state of the GPS solution for a GPS enabled device under test is needed.

It will further be understood that indicator assembly 12 may provide functionality capable of detecting an incidence of a GPS signal error and sending a different type of alert to a human operator monitoring a test in real time. For example, instead of the human operator looking toward indicator assembly 12 to check the orientation of the daytime or nighttime indicator or listening for a sound emitted by indicator assembly 12, the indicator assembly may send an alert directly to the human operator. The electronic alert may be pushed to the user via some form of wired connection such as RS-232, Ethernet, etc. In other examples, the electronic alerts may be provided to the user wirelessly through a communication channel such as an Ethernet connection, WiFi® (a trademark of Wi-Fi Alliance of Austin, Tex., US), BLUETOOTH® (a trademark of Bluetooth Sig, Inc. of Kirkland, Wash., US), XBee™ (a trademark of Digi International, Inc. of Minnetonka, Minn., US), a cellular connection, or any other type of communication channel. The alerts may come in the form of emails, text alerts, or even a graphics display on a cell phone or other electronic display. The alerts may be programmed to occur when the deviation between expected and calculated position differs by some programmed or configurable amount or when detectable errors (loss of satellite reception, for example) are observed.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound-generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. An indicator assembly for detecting and indicating a GPS error in a GPS enabled device under test, wherein the indicator assembly comprises:
    an azimuth-elevation (azel) servo system;
    a Global Positioning System (GPS) receiver;
    a microprocessor operatively engaged with the GPS receiver and the azel servo system;
    an indicator device operatively engaged with the azel servo system and movable by the azel servo system; and
    programming executable by the microprocessor to configure the GPS receiver to receive signals from a remote satellite, to compute a reported-position solution of the indicator assembly, to receive the reported-position solution of the indicator assembly from the GPS receiver, and to compare an expected self-position solution of the indicator assembly with the reported-position solution of the indicator assembly in order to indicate the GPS error in the GPS enabled device under test.

2. The indicator assembly according to claim 1, wherein the azel servo system includes an azimuth servo motor and an elevation servo motor; and wherein the azel servo system is operatively engaged with the indicator device to selectively rotate the indicator device one or both of around a vertical axis and around a horizontal axis.

3. The indicator assembly according to claim 1, further comprising a stand, wherein the azel servo system and the indicator device are mounted on the stand and the stand is adapted to hold the azel servo system and the indicator device a distance above a ground surface upon which the stand rests.

4. The indicator assembly according to claim 1, wherein the indicator device comprises one or both of a daytime indicator and a nighttime indicator.

5. The indicator assembly according to claim 4, wherein the daytime indicator comprises a shaft with an arrowhead at one end.

6. The indicator assembly according to claim 4, wherein the nighttime indicator comprises an eye-safe laser pointer that emits a visible laser beam.

7. The indicator assembly according to claim 1, further comprising a control unit operatively engaged with the azel servo system, wherein one or both of the microprocessor and the GPS receiver is a part of the control unit.

8. The indicator assembly according to claim 7, wherein the control unit further includes one or more of a power source, a user interface, one or more Light Emitting Diodes (LEDs), a control button, a slot adapted to receive a memory card, a communication port, and a sound-generating device.

9. The indicator assembly according to claim 7, wherein the indicator assembly includes an indicator head, wherein the azel servo system is provided on the indicator head, wherein the control unit is remote from the indicator head; and wherein the indicator assembly further comprises a cable that operatively engages the control unit and the azel servo system to each other.

10. The indicator assembly according to claim 1, further comprising programming executable by the microprocessor for controlling the azel servo system and for controlling a rotation of the indicator device utilizing the azel servo system.

11. A testing system comprising:
a Global Positioning System (GPS) enabled device;
an indicator assembly for detecting and indicating a GPS signal error in real time to an operator testing the GPS enabled device; wherein the indicator assembly comprises:
   an azimuth-elevation (azel) servo system located remote from the GPS enabled device;
   a GPS receiver that provides a reported-position solution of the indicator assembly;
   a microprocessor operatively engaged with the GPS receiver and the azel servo system;
   an indicator device operatively engaged with the azel servo system and movable by the azel servo system; and
   programming executable by the microprocessor for:
      calculating a difference between an expected self-position solution of the indicator assembly stored in the microprocessor and the reported-position solution of the indicator assembly provided by the GPS receiver; and
      activating the azel servo system to move the indicator device in response to the calculated difference between the expected self-position solution of the indicator assembly and the reported-position solution of the indicator assembly.

12. The system according to claim 11, further comprising a sound-generating device provided in the indicator assembly.

13. The system according to claim 11, wherein the indicator device comprises a daytime indicator and a nighttime indicator that are oriented to point in substantially a same direction; and wherein the daytime indicator and nighttime indicator are moved by the azel servo system substantially simultaneously and in unison.

14. A method of detecting a Global Positioning System (GPS) error in a system for testing or monitoring a GPS enabled device; wherein the method comprises:
   configuring a GPS receiver on an indicator assembly;
   providing an expected self-position solution of the indicator assembly to a microprocessor on the indicator assembly;
   determining a reported-solution position of the indicator assembly with the GPS receiver;
   comparing, with programming executed by the microprocessor, the reported-position solution of the indicator assembly with the expected self-position solution of the indicator assembly; and
   moving a visible indicator on the indicator assembly based on the comparison of the reported-position solution of the indicator assembly and the expected self-position solution of the indicator assembly.

15. The method according to claim 14, further comprising:
   testing or monitoring a GPS enabled device;
   noticing an unexpected action during the testing or monitoring of the GPS enabled device;
   visually checking for movement of the visible indicator on the indicator assembly when the unexpected action is noticed.

16. The method according to claim 15, further comprising:
   determining no GPS signal error has occurred when the visible indicator is oriented generally vertically and substantially at right angles relative to a surface upon which the indicator assembly rests.

17. The method according to claim 15, further comprising:
   determining a GPS signal error has occurred if the visible indicator is oriented at an angle other than right angles relative to a surface upon which the indicator assembly rests.

18. The method according to claim 17, further comprising:
   detecting the GPS signal error in real time.

19. The indicator assembly according to claim 1, wherein the indicator device is positioned in an orientation that reflects the comparison between the reported-position solution and the expected self-position solution visually indicating the GPS error.

* * * * *